Sept. 21, 1965 S. ZAROMB 3,207,061
APPARATUS AND METHOD FOR SEPARATING SLURRIES INTO
SOLID AND FLUID COMPONENTS
Filed July 8, 1963
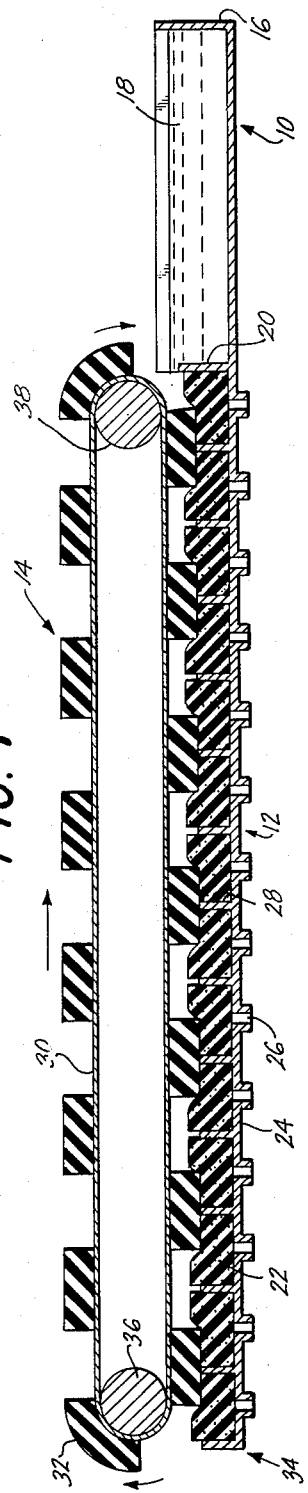
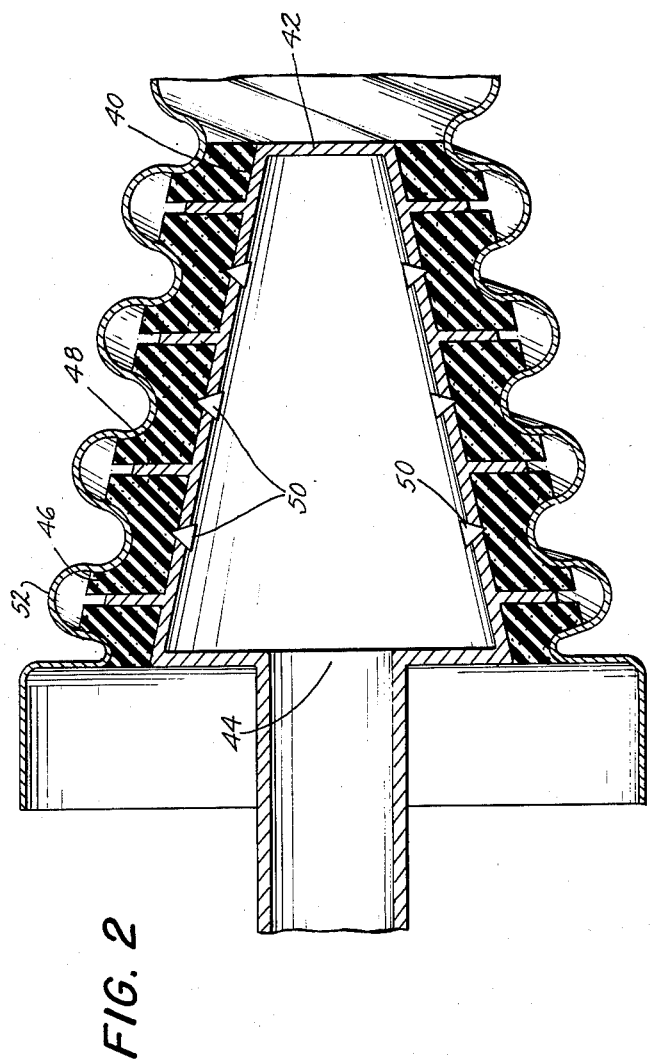
INVENTOR.
SOLOMON ZAROMB
BY
ALAN K. ROBERTS
ATTORNEY

United States Patent Office 3,207,061
Patented Sept. 21, 1965

3,207,061
APPARATUS AND METHOD FOR SEPARATING SLURRIES INTO SOLID AND FLUID COMPONENTS
Solomon Zaromb, 376 Monroe St., Passaic, N.J.
Filed July 8, 1963, Ser. No. 293,446
12 Claims. (Cl. 100—37)

This invention relates to apparatus and methods for separating slurries into solid and fluid components.

It is an object of the invention to provide improved devices and techniques for separating solids from fluids by continuous processes thereby avoiding the inconveniences inherent in batch processes.

It is a further object of the invention to provide improved devices and techniques for separating solids from fluids in connection with applications requiring small weight and volume and little or no maintenance.

It is yet a further object of the invention to provide improved devices and techniques for separating slurries into solid and fluid components while avoiding such operations as field assembling and disassembling, cleaning, slurry storage and so forth.

In achieving the above and other of its objectives, the invention contemplates the use of a technique whereby continuing filtration is effected by passing a slurry over successive spongy segments which are alternatively compressed and allowed to distend.

The distending segments absorb fluid from the slurry which is urged thereacross. The fluid may then be forced out of the segments during the compressing thereof and such removed fluid may be drained by way of gravity or through one-way valves in such a manner as to provide the permanent separation therefrom from the previously associated solids.

According to a further feature of the invention, the spongy segments may be provided with interfaces which are closed off to prevent the transfer of fluid from a segment which is being compressed to a segment which is being permitted to distend.

According to a further feature of the invention, the surface of the spongy segments across which the slurry is urged may be provided with finer pores than the main body of the segments to minimize any tendency to clog the pores.

Other objects, as well as features and advantages of the invention will be apparent from the following detailed description of some preferred embodiments as illustrated in the accompanying drawing in which:

FIGURE 1 is a diagrammatic showing of one embodiment of the invention in which a slurry is taken from a reservoir and urged across the surface of a plurality of spongy segments; and FIGURE 2 is a diagrammatic sectional view of a second embodiment of the invention in which the slurry is moved in a helical path about a plurality of spongy segments.

As has been noted above, the invention contemplates a method for separating a slurry into solid and fluid compounds, which method comprises urging the slurry across a spongy element while alternately compressing the latter and releasing the same.

As will became apparent hereinafter, the method of the invention further provides for progressively compressing spongy elements in generally the same direction in which the slurry is urged across the spongy elements and at the same rate as that at which the slurry travels across said elements.

In FIG. 1 is illustrated a slurry supply means 10, a spongy means 12, and a transfer and compression means 14.

The supply means 10 may consist of a casing 16 in which is accommodated and stored a slurry 18, said slurry being removable through an open side 20 of said casing.

The spongy means 12 consists generally of a plurality of rectilinearly aligned segments 22 which are preferably of light shape and of a generally porous nature such as natural or synthetic sponge, foam rubber or the like. Preferably the upper surface of the segments 22, which is that surface across which the slurry is urged, is provided with finer pores than the main body of the segments in order to avoid clogging of the pores with the solid materials in said slurry.

The segments 22 are supported on a frame 24 provided with a plurality of fluid outlets 26 which may be merely openings through which the fluid is discharged under the influence of gravity, or, alternatively, one-way valves through which the fluid is forced for permanent separation from the solids previously associated therewith.

Between the segments 22 are respectively interface elements 28 which may be constituted by skins on the spongy elements 22 or may be alternatively separate flexible elements of a material such as solid rubber, or the like. It is the function of the interface elements 28 to isolate the spongy segments 22 from one another so that no fluid communication therebetween can occur.

In FIG. 1, the transfer and compression means 14 comprises generally an endless belt 30 on which are mounted a plurality of spaced and parallel protrusions 32 which are preferably of a flexible material such as solid rubber or plastic, or the like. Said protrusions 32 are of a thickness whereby when traversing the spongy segments 22 they compress the same to prime the segments for absorbing fluid from the slurry being processed thereby.

The apparatus in FIG. 1 is, moreover, provided with a solid outlet means 34 constituted by a ramp or the like at the end of the alignment of segments 22 which is most remote from the source 10 of the slurry.

It will be noted that the segments are preferably of a longitudinal extent which is equal to the width of the segments 22 so that the protrusions 32 occupy the full distance between the adjacent interface elements 28. This assures that a segment 22 can be fully compressed for the expressing of fluid therefrom.

In operation, the protrusions 32 force slurry from the casing 16 across the upper surface of the segments 22 progressively from the right to the left in FIG. 1.

At the same time, the protrusions 32 are alternately compressing the segments 22 and permitting the same to expand or extend whereby fluid is absorbed from the slurry superimposed on the segments.

When fluid has been absorbed from the slurry, the compressing of the segments containing such fluid will urge the fluid therefrom through the fluid outlets 26.

Operation of the belt 30 is effected through a drive shaft 36 with which is associated an idler shaft 38, the method of operation of endless belt 30 being too well known to warrant detailed explanation in this text.

A variation of the invention is shown in FIG. 2 wherein is shown a conical support 40 which is one form of a circularly developed frame, the support being closed at end 42 thereof and open at end 44 thereof to provide for fluid discharge.

Mounted around the support 40 are a plurality of segments 46 between which, as noted above with respect to the previously described embodiment, are interface elements 48.

A plurality of one-way valves 50 are illustrated forming the fluid outlet means associated with support 40.

Encircling the support 40 is a helically developed expressing element 52, the inner diameter of which is such as to provide for an alternate compressing and expanding of the segments 46.

The expressing element 52 and the support 40 are both coaxial and relatively rotatable, as a result of which a progressive compressing of segments 46 from one end to the other of the illustrated alignment of which is possible.

In accordance with the method generally described above, a slurry is urged across the outer surface of segments 46, the alternate compressing and expansion of which causes a separation of the fluid component of the slurry from the solid component thereof, with fluid component being forced through one-way valves 50 and thence discharged via the open end 44 which has been noted above.

There will now be obvious to those skilled in the art many modifications and variations of the apparatus and techniques disclosed above. Such modifications and variations will not, however, depart from the scope of the invention if defined by the following claims.

What is claimed is:

1. Apparatus for separating a slurry into solid and fluid components, said apparatus comprising supply means for supplying said slurry, spongy means adjacent said supply means having slurry contacting portions, and transfer and compression means for transferring said slurry from said supply means progressively across said slurry contacting portions of said spongy means while alternately compressing said spongy means to drive fluid therefrom and releasing said spongy means to enable the latter to absorb fluid from the slurry.

2. Apparatus for separating a slurry into solid and fluid components, said apparatus comprising supply means for supplying said slurry, spongy means adjacent said supply means, and transfer and compression means for transferring said slurry from said supply means progressively across said spongy means while alternately compressing said spongy means to drive fluid therefrom and releasing said spongy means to enable the latter to absorb fluid from the slurry, said spongy means comprising a plurality of serially arranged spongy segments, and impervious separators positioned between the segments.

3. Apparatus as claimed in claim 2 comprising fluid outlet means operatively associated with the segments for the removal of fluid from the latter.

4. Apparatus as claimed in claim 3 comprising solid outlet means operatively associated with the one of said segments which is most remote from said source.

5. Apparatus as claimed in claim 3, wherein said segments are linearly aligned and said transfer and compression means comprises an endless belt and a plurality of longitudinally spaced protrusions on said belt adapted to push slurry from said supply means across the segments while compressing the latter.

6. Apparatus as claimed in claim 3 comprising a circularly developed support on which said segments are mounted and in which said fluid outlet means are disposed and wherein said transfer and compression means comprises a helically developed member encircling said support with the segments thereon, the support and member being coaxial and relatively rotatable.

7. Apparatus as claimed in claim 3, wherein said fluid outlet means comprises at least one one-way valve.

8. A method for separating a slurry into solid and fluid components, said method comprising passing the slurry across and relative to a surface of successive spongy elements while alternately compressing the latter and releasing the same during the passage of said slurry across said surface.

9. A method as claimed in claim 8, comprising progressively compressing the spongy elements in the same direction as that in which the slurry is urged and at the same rate as that at which the slurry is urged across said element.

10. Apparatus as claimed in claim 1, wherein said transfer and compression means comprises solid protrusions disposed at least in part across successive of said spongy means, said protrusions and spongy means being adapted for relative motion therebetween.

11. Apparatus as claimed in claim 10 comprising, and wherein said protrusions are spaced longitudinally on, an endless belt.

12. Apparatus as claimed in claim 10, wherein said protrusions are in the form of at least one helix on a supporting surface of revolution.

References Cited by the Examiner

UNITED STATES PATENTS

| | | | |
|---|---|---|---|
| 1,259,774 | 3/18 | Peters | 15—97 |
| 2,207,278 | 7/40 | Albrecht. | |
| 2,910,185 | 10/59 | Wehner | 210—402 X |
| 3,051,973 | 9/62 | Jacques | 15—99 |

WALTER A. SCHEEL, *Primary Examiner.*